US011345075B2

United States Patent
Heinz

(10) Patent No.: US 11,345,075 B2
(45) Date of Patent: May 31, 2022

(54) METHOD FOR BENDING A PLASTIC TUBE AND DEVICE FOR CARRYING OUT THE METHOD

(71) Applicant: Joma-Polytec GmbH, Bodelshausen (DE)

(72) Inventor: Stefan Heinz, Bodelshausen (DE)

(73) Assignee: JOMA-POLYTEC GMBH, Bodelshausen (DE)

( * ) Notice: Subject to any disclaimer, the term of this patent is extended or adjusted under 35 U.S.C. 154(b) by 0 days.

(21) Appl. No.: 17/252,081

(22) PCT Filed: Jun. 11, 2019

(86) PCT No.: PCT/EP2019/065169
§ 371 (c)(1),
(2) Date: Dec. 14, 2020

(87) PCT Pub. No.: WO2019/238654
PCT Pub. Date: Dec. 19, 2019

(65) Prior Publication Data
US 2021/0245419 A1      Aug. 12, 2021

(30) Foreign Application Priority Data
Jun. 12, 2018 (DE) .......................... 102018209353.9

(51) Int. Cl.
*B29C 53/84* (2006.01)
*B29C 53/08* (2006.01)

(52) U.S. Cl.
CPC ............ *B29C 53/84* (2013.01); *B29C 53/083* (2013.01)

(58) Field of Classification Search
CPC ........ B29C 53/84; B29C 53/083; B29C 53/08
See application file for complete search history.

(56) References Cited

U.S. PATENT DOCUMENTS 2,571,416 A * 10/1951 Brown .................. B29C 53/083
65/281
3,884,612 A * 5/1975 Parmann ............... B29C 53/083
425/384

(Continued)

FOREIGN PATENT DOCUMENTS

DE      10222256 A1 * 12/2003 ............. B29C 53/84
DE      10222256 A1    12/2003
WO      97/07969 A1     3/1997

OTHER PUBLICATIONS

A Summary of Polymer Characterization, published by PerkinElmer (available in the webpage: https://labsense.fi/uploads/7/1/9/5/71957143/polymer_characterization_technical_poster.pdf). (Year: 2006).*

(Continued)

*Primary Examiner* — Leith S Shafi
*Assistant Examiner* — Inja Song
(74) *Attorney, Agent, or Firm* — Hoffmann & Baron, LLP

(57) ABSTRACT

Method for bending a plastic pipe including arranging a bending portion of a plastic pipe in a heating zone of a heater and performing contactless local heating of the bending portion, wherein the heater is adapted to provide a first predetermined temperature difference between a neutral zone of the bending portion and a compression zone of the bending portion and a second predetermined temperature difference between the neutral zone and the compression zone of the bending area and an expansion zone of the bending area, introducing bending forces on holding regions arranged on the plastic pipe at a distance from the bending area and/or introducing bending forces on the bending area for deforming the plastic pipe into a deformation position and cooling the plastic pipe in the deformation position.

2 Claims, 3 Drawing Sheets

(56) References Cited

U.S. PATENT DOCUMENTS

| | | | | |
|---|---|---|---|---|
| 5,066,212 | A * | 11/1991 | Moran, Jr. | B29C 53/083 |
| | | | | 425/145 |
| 5,422,048 | A * | 6/1995 | Kodama | B29C 35/0261 |
| | | | | 264/173.17 |
| 6,257,864 | B1 * | 7/2001 | Roberts | B29B 13/024 |
| | | | | 264/339 |
| 6,309,588 | B1 | 10/2001 | Powell et al. | |
| 2006/0017192 | A1 * | 1/2006 | Claus | B29C 53/083 |
| | | | | 264/159 |
| 2015/0048558 | A1 * | 2/2015 | Tabanelli | B29C 57/00 |
| | | | | 264/481 |
| 2017/0239877 | A1 * | 8/2017 | Lin | H05B 6/105 |
| 2018/0370113 | A1 * | 12/2018 | Gordin | B32B 1/08 |

OTHER PUBLICATIONS

Proof of the publication date of "A Summary of Polymer Characterization" in the google search (dated on Oct. 30, 2016). (Year: 2006).*

English translation of DE-10222256-A1 by EPO. (Year: 2003).*

* cited by examiner

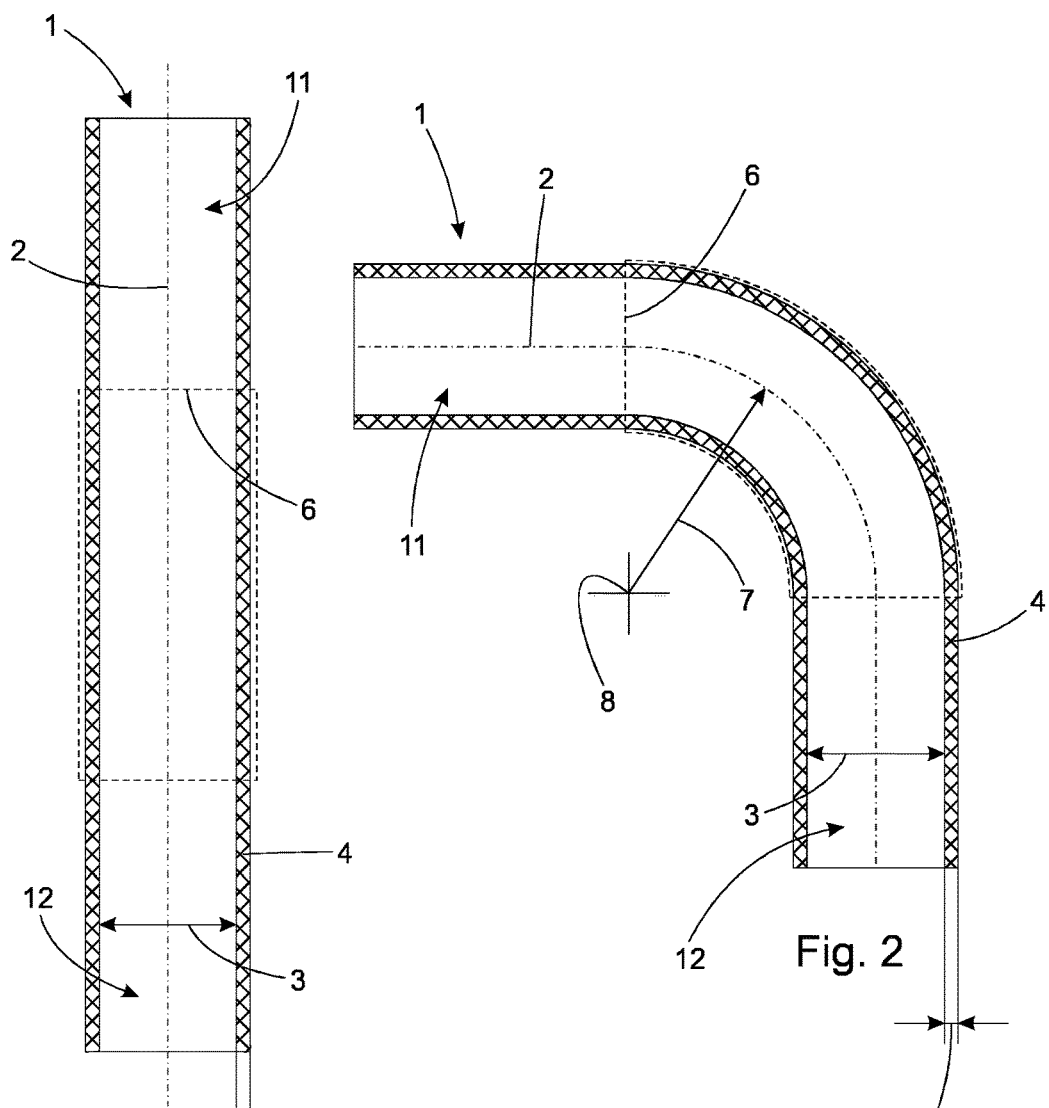
Fig. 1
Fig. 2
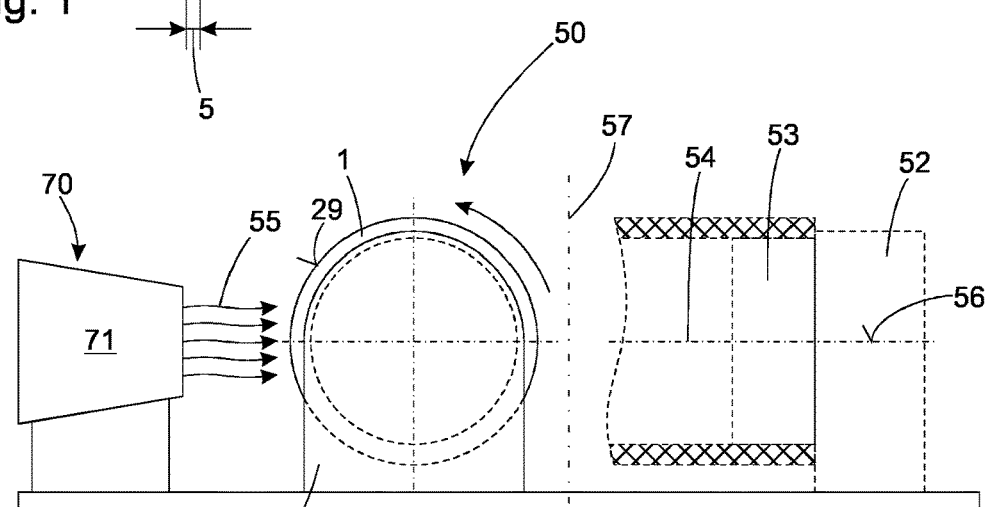
Fig. 7

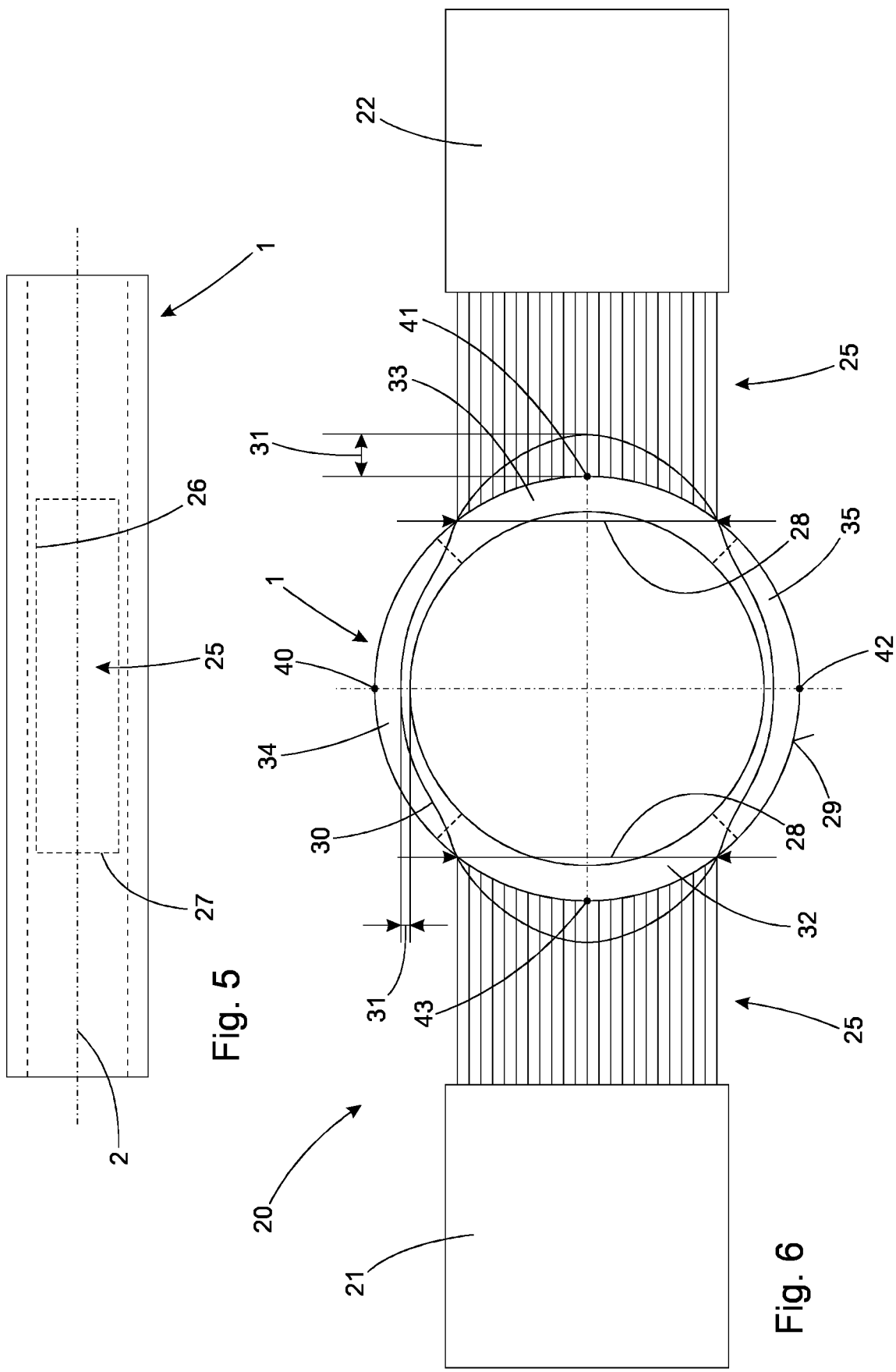

METHOD FOR BENDING A PLASTIC TUBE AND DEVICE FOR CARRYING OUT THE METHOD

This application claims priority based on an International Application filed under the Patent Cooperation Treaty, PCT/EP2019/065169, filed on Jun. 11, 2019, which claims priority to DE 10 2018 209 353.9, filed Jun. 12, 2018.

BACKGROUND OF THE INVENTION

The invention relates to a method for bending a plastic pipe. Furthermore, the invention relates to a device for carrying out the method. Plastic pipes are used in a wide variety of applications, especially for a transport of liquids or gases. For a multitude of applications, especially in the automotive and consumer appliance industries, plastic pipes are used which are initially produced in a plastic extrusion process and are therefore essentially straight. Subsequently, the plastic pipes may be bent in certain areas depending on the respective application and, if necessary, to provide them with connecting pieces at the ends. For a bending process of plastic pipes which are made of a thermoplastic material, it is known to heat an outer circumference of the plastic pipes in the area of a bending area and to support a pipe wall of the plastic pipe in the area of the bending area on the outside and/or inside during a subsequent bending process.

SUMMARY OF THE INVENTION

The purpose of the invention is to simplify the production of bent plastic pipes.

This task is solved for a method for bending a plastic pipe of the type mentioned above with the features of claim 1. The following steps are provided: arranging a bending area of a plastic pipe in a heating zone of a heater and performing contactless local heating of the bending area, the heater generating a first predetermined temperature difference between a neutral zone of the bending area and a compression zone of the bending area and a second predetermined temperature difference between the neutral zone of the bending area and an expansion zone of the bending area, introduction of bending forces on holding areas arranged on the plastic pipe at a distance from the bending area and/or introduction of bending forces on the bending area to deform the plastic pipe into a deformation position and cooling the plastic pipe in the deformation position.

In this method for bending a plastic pipe, it is intended to heat the bending area inhomogeneously in a predefined manner in order to achieve different types of deformation in the bending area when carrying out the deformation of the plastic pipe. During a bending process for a plastic pipe, it can be assumed that an initially straight central axis of the plastic pipe is deformed in the bending area to a curve, whereby a center of the curved part of the central axis is usually outside the plastic pipe and a bending radius for the curved part of the central axis is usually larger than a diameter of the plastic pipe. Due to the contactless heating, different geometries of plastic pipes can be bent without having to make changes to the bending apparatus.

The bending process is based on the following considerations: initially the material of the plastic pipe has a constant wall thickness. In a compression zone which faces the center of curvature and which extends over a part of a circumference of the plastic pipe the plastic pipe is elastically and plastically compressed, wherein a percentage of the plastic deformation is much higher than a percentage of the elastic deformation. The material compression may result in an increase of the wall thickness of the plastic pipe in the compression zone. Furthermore, the material of the plastic pipe is elastically and plastically stretched in an expansion zone facing away from the center of curvature. The expansion zone extends over a part of the circumference of the plastic pipe, whereby wherein a percentage of the plastic deformation is much higher than a percentage of the elastic deformation. The material expansion in the expansion zone may result in a reduction of the wall thickness of the plastic pipe in the expansion zone. In addition, the material of the plastic pipe is at least elastically and plastically deformed in two neutral zones, which each extend over part of a circumference of the plastic pipe between the compression zone and the expansion zone of the plastic pipe. In the neutral zones the percentage of the plastic deformation is considerably smaller than in the compression zone and in the expansion zone. As a result the wall thickness of the plastic pipe in the neutral zones can be assumed almost constant after the bending process has been carried out.

The method according to the invention takes these different deformation phenomena into account in that a heating of the bending area in the compression zone and in the expansion zone is greater than in the neutral zones to ensure the first temperature difference and the second temperature difference. This allows a plastic deformation of the compression zone and the expansion zone without damaging the plastic pipe. The heating of the bending area in the neutral zones is less compared with the heating in the compression zone and compared with the heating in the expansion zone and is preferably chosen in such a way that the neutral zones have a considerably higher dimensional stability. Thus, the neutral zones have a stabilizing effect on the bending area of the plastic pipe due to their lower heating and contribute to the fact that the plastic pipe does not experience undesired cross-sectional changes, in particular no cross-sectional narrowing, in the intended deformation position in the bending area, even without the use of stabilizing means to be inserted into the plastic pipe.

According to an advantageous embodiment of the invention the first temperature difference between the compression zone and the neutral zone and the second temperature difference between the expansion zone and the neutral zone are chosen dependent from the material properties of the plastic pipe and dependent from on a bending radius for the bending area in such a way that the bending process and the resulting deformation of the plastic pipe in the bending area can be realized without mechanical support on an outer surface and/or on an inner surface of the plastic pipe. On the one hand, this results in greater degrees of freedom for carrying out several bending operations on the plastic pipe. On the other hand, advantages can be achieved in cycle times for carrying out the bending operations. In particular a lower or higher temperature level is provided for heating the compression zone than for heating the expansion zone, so that the first temperature difference is lower or higher than the second temperature difference.

The heating of the bending area will result in a temperature profile over the cross-section of the plastic pipe in the bending area which will have an at least essentially constant temperature profile, since due to the usually homogeneous thermal conductivity properties of the plastic pipe no considerable temperature steps occur in the pipe wall, although the temperature profile may have different temperature gradients in different areas of the plastic pipe. The temperature difference between the compression zone and the neutral zone and between the expansion zone and the neutral zone is preferably determined in quadrants of the cross-section of the plastic pipe, i.e. in particular in areas of the plastic pipe which are offset by 90 degrees relative to the central axis of the plastic pipe.

As an example, it can be provided that the bending forces introduced on the plastic pipe via the holding areas arranged away from the bending area are at least substantially aligned in a bending force plane. This bending force plane preferably includes the central axis of the plastic pipe. Furthermore the bending force planes intersecting the compression zone and the expansion zone, while the two neutral zones are arranged at a distance from the bending force plane.

In addition or alternatively, it can be provided that a force introduction for the bending forces takes place directly in the bending area, for example by means of correspondingly designed forming tools (female and male), which determine the geometry of the plastic pipe after the bending process has been carried out and which are pressed against the bending area for carrying out the bending process.

Advantageous further developments of the invention are subject of the subclaims.

It is expedient if the heater for the deformation of the plastic pipe causes a heating of the compression zone and for the expansion zone above a material-specific melting temperature so that the compression zone and the expansion zone are in a thermoplastic state and that the first temperature difference and the second temperature difference are selected such that neutral zones adjacent to the compression zone and the expansion zone are in a thermoelastic state. By heating the compression zone and the expansion zone above the material-specific melting temperature, plastic deformation of these zones is possible with a low force level. Furthermore, undesirable cracks in the expansion zone and undulation in the compression zone can be avoided by a deformation that is adapted to the material-specific properties of the plastic pipe and the geometry of the plastic pipe, without the need for mechanical support of the pipe wall. Heating the neutral zones to a temperature level at which the material of the plastic pipe exhibits thermoelastic properties prevents a brittle behaviour of the material of the plastic pipe in these zones. Rather, this ensures that the neutral zones can be deformed at least largely elastically during the bending process, possibly with a slight plastic deformation component, without suffering damage that could have a negative effect on the durability of the plastic pipe.

It is preferable that the first temperature difference between the neutral zone and the compression zone and/or the second temperature difference between the neutral zone and the expansion zone is in an interval of 100 degrees Celsius to 160 degrees Celsius for polyamide materials (PA) and in an interval of 140 degrees Celsius to 180 degrees Celsius for polyphenylene sulfide materials (PPS). In particular, it is intended that the compression zone and/or the expansion zone are heated to a temperature above the material-specific melting temperature. The material-specific melting temperature (which is slightly above the material-specific softening temperature) of polyamide materials is typically in the range of 220 degrees Celsius. The material-specific melting temperature (which is slightly above the material-specific softening temperature) of polyphenylene sulfide materials is typically in the range of 260 degrees Celsius. In contrast, the temperature in the neutral zones should be in the range of 80 to 100 degrees Celsius for polyamide materials and 100 to 130 degrees Celsius for polyphenylene sulfide materials.

According to a further embodiment of the method, it is intended that the heater comprises two heating sources arranged at a distance from each other in order to heat strip-shaped surface sections of the bending area from opposite spatial directions. This ensures an efficient heat input into the compression zone and the expansion zone of the plastic pipe. A geometric extent of a first strip-shaped surface area resulting from a heat input from a first heating source to the compression zone may be different from a geometric extent of a second strip-shaped surface area resulting from a heat input from a second heating source to the expansion zone. Preferably, the first strip-shaped surface area and the second strip-shaped surface area each cover the entire bending area along the central axis of the plastic pipe and cover an angular range of 80 degrees to 120 degrees in the circumferential direction of the plastic pipe. It is particularly preferred that the first strip-shaped surface area, which is assigned to the compression zone, covers a smaller angular range than the second strip-shaped surface area, which is assigned to the expansion zone.

According to a further embodiment of the method it is provided that a first heating source carries out a contactless radiation heating of the compression zone with a hot gas flow or with electromagnetic waves, preferably light waves, in particular infrared light waves, and that a second heating source carries out a contactless radiation heating of the expansion zone with a hot gas flow or with electromagnetic waves, preferably light waves, in particular infrared light waves. With a contactless heating of the bending area, mechanical requirements for the geometry of the plastic pipe to be deformed can be kept at a low level. Any diameter deviations or roundness deviations of the plastic pipe that may occur have only a minor influence on the heating properties of the two heating sources. If a hot gas stream is used, the heating of the plastic pipe is at least largely independent of its radiation absorption properties, so that plastic materials with only low radiation absorption can also be used for the plastic pipe. When using electromagnetic waves in a wavelength range between 350 nanometers and 800 nanometers, effective heating of the bending area can be realized with comparatively little technical effort. This is particularly true when using heating sources that use electromagnetic waves in the visible wavelength range between 380 nanometers and 750 nanometers. The use of electromagnetic waves in the wavelength range between 620 nanometers and 770 nanometers, also known as the infra-red light range, is particularly advantageous, since in this case requirements for safety measures, for example against the emission of electromagnetic waves during the process, can be kept at a cost-effective level. It is particularly preferred that the heating sources are designed as laser sources, whereby a particularly exact specification for the geometry of the strip-shaped surface areas on the plastic pipe can be ensured.

It is advantageous if the heating sources provide the electromagnetic waves as a parallel beam or as a diverging beam to the bending area. At least in the case that the respective heating source is located opposite the compression zone or opposite the expansion zone, the angle at which the rays of the beam impinge on the surface of the bending area alone results in an absorption distribution for the rays impinging on the plastic pipe which corresponds to the desired temperature distribution over the cross-section of the plastic pipe. A provision of the beam as a parallel beam can be easily realized for an array of laser diodes, which form the respective heating source. If an infrared light source, such as a quartz rod being heated with electricity is used as the heating source, the rays of the beam are emitted divergently, whereby a stronger temperature gradient can be achieved between the respective neutral region and the compression region or the expansion region compared with a heating based on parallel beams.

According to a further embodiment of the method it is intended that a rotational relative movement between the plastic pipe and the heating sources is carried out around a longitudinal axis of the plastic pipe. The temperature differences between the neutral zones and the compression zone as well as the expansion zone are caused by varying a rotational speed of the plastic pipe and/or a radiation intensity of the heating sources during rotation of the plastic pipe. Such a procedure is of particular interest if the apparatus provided for carrying out the method is to be used for different pipe cross-sections of plastic pipes, since in such a case the desired local heating of the compression zone and the expansion zone can be achieved at least largely independently of the diameter of the plastic pipe by varying the speed of rotation of the plastic pipe and/or varying the radiation intensity of the heating sources. A variation of the radiation intensity is particularly suitable for heating sources with a low inertia, as is the case with laser light sources, especially laser diodes. Such heating sources can be controlled by a frequency modulated control signal. A variation of the rotation speed is possible if the heating source has a high inertia, as is the case with a heating source like a quartz rod. In particular, it can be provided to apply a suitable control signal to a drive for the plastic tube, which is intended to initiate a rotational movement, so that an angular velocity of the plastic pipe is low if a compression zone or an expansion zone is located opposite the heating source, whereas an angular velocity of the plastic pipe is higher if a neutral zone is located opposite the heating source.

It is preferable that the bending forces are applied to the holding areas on the plastic pipe at a distance from the bending area when the expansion zone has reached a thermoplastic state by heating above a material-specific glass transition temperature.

The task of the invention is solved according to a second aspect of the invention by an apparatus which is designed to carry out the method according to the invention, wherein a fixture for fixing the plastic pipe and a heater for heating the plastic pipe are arranged on a machine frame and wherein the fixture is designed for a rotational relative movement of the plastic pipe with respect to the heater or wherein the heater is designed for a rotational relative movement with respect to the fixture, and with a drive for providing the relative movement and with a controller for a variation of a rotational speed of the drive and/or for a variation of an energy flow from the heater to the plastic pipe.

As an example, the fixture is designed as a clamp which grips the plastic pipe on an outer surface and thus enables the plastic pipe to be fixed during the heating process and, if necessary, bending forces to be introduced. Such a design of the fixture is advantageous if several bends are to be formed on the plastic pipe to be deformed. Alternatively, the fixture is designed as a mandrel which is inserted into the plastic pipe at the end and thus enables the plastic pipe to be fixed during the heating process and, if necessary, the introduction of bending forces.

Optionally, the fixture or the heater is assigned a drive, which is especially designed as a pneumatic motor or as an electric motor and which enables the initiation of a rotational relative movement between fixture and heater. The drive receives its (pneumatic or electric) drive energy from a controller, which may control a variation of an energy flow from the heater to the plastic pipe in order to be able to effect the desired inhomogeneous heating of the bending area.

Furthermore, the fixture can be assigned a drive to influence a spatial alignment of at least two fixtures to each can be changed, whereby the desired introduction of bending forces onto the plastic pipe takes place if a plastic pipe is held on the fixture. The drive may be, for example, an electric or pneumatic linear drive or swivel drive. The fixture can be designed either for manual operation or for an operation by external forces. In the case of manual actuation, it is intended that an operator of the device places the plastic pipe in the fixture and then closes the fixture manually. After the bending process has been completed, the fixture is opened again and the plastic pipe is removed by the operator. If the fixture is designed for external force actuation, it may be provided, for example, that an electrically or pneumatically operated actuator is assigned to the fixture, which, depending on a control signal or a fluid flow, causes the respective fixture to open or close. Also in this case, a manual insertion of the plastic pipe can be provided, alternatively a supply and removal of the plastic pipe via a conveyor or an industrial robot is provided.

The heater may in particular have two heating sources which are arranged opposite each other and between the fixtures and which are preferably fixed to the machine frame.

The controller may be a programmable logic controller (PLC) and serves to provide control signals, in particular to control the heater and the drive as well as, if necessary, the movement device and to carry out the desired functions for these components according to a specifiable production sequence.

According to a further embodiment of the invention a second fixture is provided, wherein the two fixtures are arranged at a distance from one another on the machine frame. Furthermore the heater is arranged in a region between the two fixtures and that at least one of the fixtures is assigned an actuator which is designed to initiate a relative movement between the two fixtures, the controller being connected to the heater and to the actuator and being designed to control the heater and to control the actuator.

BRIEF DESCRIPTION OF THE DRAWINGS

An advantageous embodiment of the invention is shown in the drawing. Here shows:

FIG. 1 a purely schematic sectional view of a plastic pipe before a bending process is performed, FIG. 2 a purely schematic sectional view of the plastic pipe after a bending operation has been performed, FIG. 3 a schematic front view of a bending apparatus for performing the bending process for the plastic pipe according to FIGS. 1 and 2, FIG. 4 a schematic top view of the bending apparatus as shown in FIG. 3, FIG. 5 a schematic top view of the plastic pipe and a heating source associated with the plastic pipe, FIG. 6 a schematic front view of the plastic pipe received in the bending apparatus with two associated heating sources, and FIG. 7 a schematic front view of a second type of bending apparatus, in which the plastic pipe is heated by a single heating source while the plastic pipe performs a rotational relative movement with respect to the heating source.

DETAILED DESCRIPTION

Figure 3:
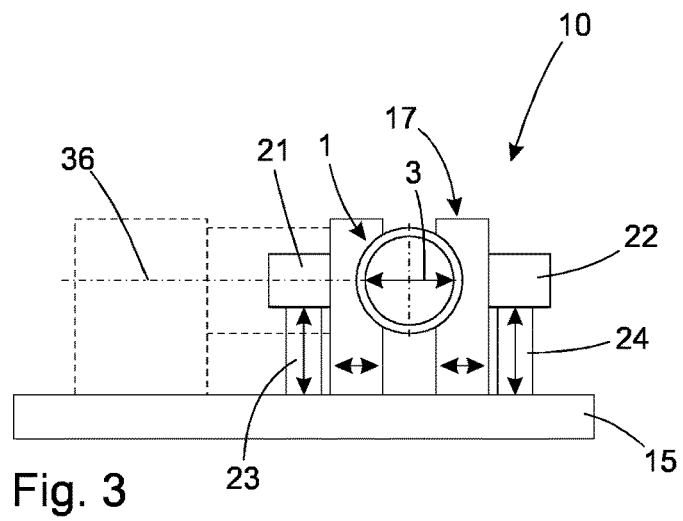

A plastic pipe 1 shown schematically in FIGS. 1 and 2 symbolically represents a large number of differently shaped and differently profiled plastic pipes, which may possibly be provided with a connection piece at least at one end region. For example the plastic pipe 1 has a circular-cylindrical cross section before a bending process is performed and the plastic pipe 1 extends with this circular-cylindrical cross section along a straight extension line 2 as shown in FIG. 1.

The plastic pipe 1 has an inner diameter 3, which is bounded by a circularly shaped pipe wall 4, whereby a wall thickness 5 of the pipe wall 4 is exemplary constant over the entire circularly shaped cross-section. The plastic pipe 1 is preferably made of a thermoplastic material such as polyethylene (PE), polypropylene (PP) or polyvinyl chloride (PVC). In particular the plastic pipe 1 is produced seamlessly in a plastic extrusion process.

As an example, it is intended that the plastic pipe 1 should be plastically deformed in a bending area 6 in order to be able to use the plastic pipe, just for example, in a cooling system not shown, in particular in a motor vehicle. Therefore the plastic pipe 1 has be transferred from the straight-line configuration of FIG. 1 to a curved configuration according to FIG. 2, whereby a pipe cross-section of the plastic pipe 1 shall be at least substantially constant along the extension line 2 after the bending method has been carried out. Furthermore, an at least substantially constant wall thickness 5 for the pipe wall 4 shall be ensured over the entire extension of the plastic pipe 1 even after the bending method has been carried out. Here it is provided that the plastic pipe 1 is to be bent with a bending radius 7 around a center of curvature 8, whereby the bending radius 7 is larger than the inner diameter 3 of the plastic pipe 1 and is therefore arranged outside the plastic pipe 1.

Figure 4:
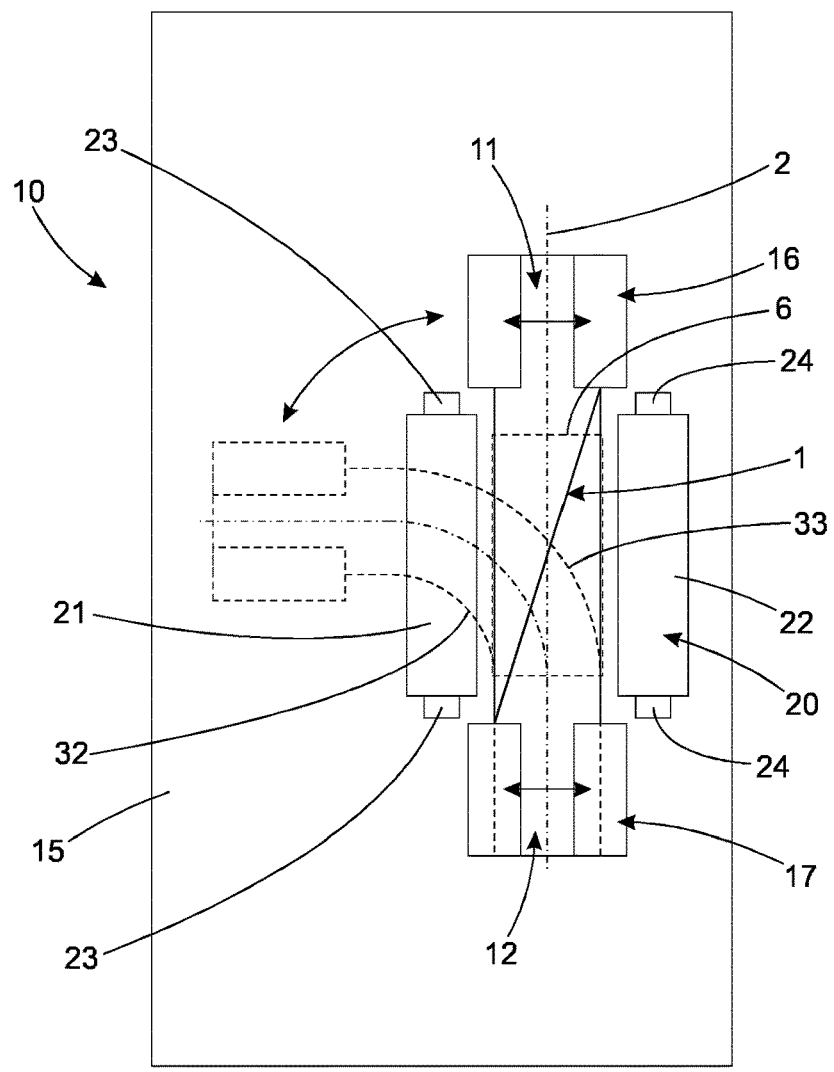

To perform the bending process, it is intended to accommodate the plastic pipe 1 as shown in FIG. 1 in a bending apparatus 10 shown in FIGS. 3 and 4. The bending apparatus 10 comprises a base plate 15, on which a first clamp 16 and a second clamp 17 are arranged. The first clamp 16 is fixed to the base plate 15 and is adjustable to reliably fix an end area 11 of the plastic pipe 1. The second clamp 17 is also adjustable to reliably fix an end area 12 of the plastic pipe 1. In addition, the second clamp 17 is movably mounted on the base plate 15 and is coupled to an actuator (not shown), which is designed to perform a pivoting movement of the second clamp 17 relative to the first clamp 16.

Furthermore, the bending apparatus 10 comprises a heater 20, which is designed for a heating of the bending area 6 of the plastic pipe 1 and which comprises a first heating source 21 and a second heating source 22, which are described in detail below in connection with the FIGS. 5 and 6. As an example, the two heating sources 21 and 22 are each mounted on linear guides 23, 24, which allow a linear movement of the respective heating source 21, 22 with respect to the base plate 15 and can thus be moved from a functional position as shown in FIG. 3 to a rest position close to the base plate 15. Each of the heating sources 21 and 22 comprises a multitude of light sources, in particular laser diodes, which are designed to provide electromagnetic radiation for the local heating of the plastic pipe 1, as shown in FIG. 6.

Due to the dimensioning of the two heating sources 21 and 22 and the light sources arranged thereon, it results from the illustration in FIG. 6 that each of the heating sources 21 and 22 is designed to provide a beam of radiation 25 which is only schematically shown and which has a longitudinal extension 26 along the extension line 2 shown in FIG. 5 and a transverse extension 27 transverse to the extension line 2 shown in FIG. 6. As can be seen from the illustrations in FIGS. 5 and 6, the beam of rays 25 determines a surface section on the plastic pipe 1, also referred to as the interaction area 28, which is defined by the fact that electromagnetic rays of the beam of rays 25 impinge directly on an outer surface 29 of the plastic pipe 1. In this interaction area 28, the beam of rays 25 causes local heating of the plastic pipe 1, depending on the material of the plastic pipe 1 on the surface and/or in the depth of the pipe wall 4. It is intended that in a central section of the interaction area 28, which extends along the extension line 2, a stronger heating occurs due to the almost perpendicular orientation of the electromagnetic rays compared with edge areas of the interaction area 28, since the rays of the beam of rays 25 impinge on the edge areas at an angle to the outer surface 29 and the rays are at least partially reflected, so that only a reduced heating occurs here.

Since the material of the plastic pipe 1 has at least a certain thermal conductivity, zones of the plastic pipe 1 that border on the interaction area 28 are also heated, whereby a rapid temperature drop occurs outside the interaction area 28 due to the rather limited thermal conductivity of the plastic pipe 1.

A schematic temperature distribution over the cross section of the plastic pipe 1 is shown in FIG. 6, whereby a distance 31 of a temperature line 30 to the pipe wall 4 at least qualitatively represents the respective temperature of the respective pipe wall section. As an example, heating of the plastic pipe 1 is provided in such a way that, due to the interaction of the beam of rays 25 with the plastic pipe 1, a process temperature of the pipe wall in a compression zone 32 as well as in an expansion zone 33 is above a material-specific glass transition temperature for the material of the plastic pipe 1, whereas a process temperature of the pipe wall in neutral zones 34, 35 is below the material-specific glass transition temperature. As an example, a first temperature difference between the neutral zone 34 and the compression zone 32 of the bending range 6, which is determined between a measuring point 40 and a measuring point 43, is approx. 50 degrees Celsius. Furthermore, a second temperature difference between the neutral zone 35 and an expansion zone 33, which is determined between a measuring point 42 and a measuring point 41, is exemplarily approx. 60 degrees Celsius. A temperature difference between measuring points 41 and 43 is thus approx. 10 degrees Celsius.

By specifically heating the bending area 6 of the plastic pipe 1, the compression zone 32 and the expansion zone 33 are thermoplastically deformable, while the neutral zones 34 and 35 are thermoelastically deformable. As a result this has the effect that neither cracking in the expansion zone 33 nor undulation in the compression zone 32 occurs on plastic pipe 1 during the bending movement when the deformation process is carried out. The bending movement is indicated by the dashed lines in FIGS. 3 and 4 and is carried out in a swivel plane 36 by swiveling the clamp 17 relative to the clamp 16. Rather, the temperature distribution in the plastic pipe 1, as caused by the heating sources 21 and 22, ensures that the neutral zones 34, 35 are at least almost exclusively elastically deformed and thereby exert a stabilizing effect on the compression zone 32 and the expansion zone 33, which are at least predominantly plastically deformed.

To carry out a bending process, the following procedure may be provided: in a first step a plastic pipe 1 with a straight extension line 2 is inserted into the bending apparatus 10 and fixed there with the aid of the two clamps 16, 17. Then, the two heating sources 21 and 22 are activated so that the plastic pipe 1 is heated locally both with respect to its extension along the extension line 2 and with respect to its outer surface 29. The heating is carried out until the plastic pipe 1 has reached its material-specific glass transition temperature in the compression zone 32 and in the expansion zone 33, while in the neutral zones 34 and 35 there is a temperature at which it is guaranteed that the material-specific glass transition temperature is not reached there. Subsequently, the two heating sources 21 and 22 are moved with the aid of the linear guides 23 and 24 from the functional position opposite to the plastic pipe 1 into a rest position (not shown) close to the base plate 15, so that subsequently the relative movement of the clamp 16 with respect to the clamp 17 can be performed, at which the bending of the plastic pipe 1 takes place. Subsequently, the plastic pipe 1 is cooled down at least below the glass transition temperature, so that there is no re-deformation of the plastic pipe 1 apart from a possible elastic recovery when the plastic pipe 1 is removed from the holding clamps 16, 17.

According to another embodiment of a bending apparatus (not shown), it is intended that only that heating source is displaced by means of the associated linear guide which is located in the pivoting range of the plastic pipe to be deformed. The other heating source which heats the expansion zone of the plastic tube remains activated during the bending process and, if necessary, performs a relative movement with respect to the base plate in order to ensure the most uniform heating of the expansion zone of the plastic pipe during the bending process while maintaining a distance from the plastic pipe.

In an alternative design of a bending apparatus 50, as shown in FIG. 7, the plastic pipe 1 is attached to two rotary bearings 51, 52. Each of the rotary bearings 51, 52 comprises a mandrel, whereby only the mandrel 53 of the rotary bearing 52 is shown in FIG. 7. The mandrels engage with the ends of the plastic pipe 1.

The mandrel 53 is rotatably mounted on the rotary bearings 52 and can perform a rotational movement about a central axis 54 of the plastic pipe 1 by means of a drive not shown in detail. As a result, the initially straight plastic pipe 1 is also set into a rotational movement.

Furthermore, the bending apparatus 50 comprises a heater 70, which has, for example, a single heating source 71 designed as a hot gas source, which is designed for a lateral supply of a hot gas stream 55 onto the outer surface 29 of the plastic pipe 1.

As an example, it is provided that an angular velocity for the rotation of the plastic pipe 1 around the central axis 54 is varied in such a way that, assuming at a constant hot gas flow 55 onto the plastic pipe 1, the same temperature distribution is achieved as shown in FIG. 6.

Subsequently, the rotary bearing 52 can be brought from a position not visible in FIG. 7, in which the mandrel 53 is coaxially aligned with a mandrel (not shown) of the rotary bearing 51, into the bending position for the plastic pipe 1 by a pivoting movement about a pivot axis 57. FIG. 7 shows the rotary bearing 52 in the final position for the bending process as a dashed line.

For the bending process, care must be taken to ensure correct rotational alignment for the plastic pipe 1 before the swivel movement is performed, so that the compression zone (not shown in FIG. 7) and the expansion zone (not shown in FIG. 7) are each cut in half by a bending plane 56 which is horizontally aligned as shown in FIG. 7 and comprises the central axis 54, while the neutral zones not shown in FIG. 7 are cut in half by a bending plane 56 which is horizontally aligned as shown in FIG. 7 and comprises the central axis 54 above the bending plane 56 are arranged mirror-symmetrically to the bending plane 56.

The invention claimed is:

1. A method for bending a plastic pipe comprising the steps:
    arranging a bending area of a plastic pipe in a heating zone of a heater and carrying out contactless local heating of the bending area, wherein the heater provides a first predetermined temperature difference between a neutral zone of the bending area and a compression zone of the bending area and further provides a second predetermined temperature difference between the neutral zone of the bending area and an expansion zone of the bending area;
    introducing bending forces onto holding regions arranged on the plastic pipe at a distance from the bending area for deforming the plastic pipe into a deformation position and/or introducing bending forces on the bending area for deforming the plastic pipe into a deformation position;
    deforming the plastic pipe into the deformation position; and
    cooling the plastic pipe in the deformation position,
    wherein a rotational relative movement is performed between the plastic pipe and the heater about a longitudinal axis of the plastic pipe and the first temperature difference and the second temperature difference are caused by variation of a rotational speed of the plastic pipe and/or a radiation intensity of the heater during the rotational movement.

2. The method according to claim 1,
    wherein the heater for performing the deformation of the plastic pipe effects a heating of the compression zone and of the expansion zone to achieve an elastic and plastic compression in the compression zone during the bending operation and to achieve an elastic and plastic expansion in the expansion zone during the bending operation and
    wherein the first temperature difference and the second temperature difference are selected such that the neutral zone adjacent to the compression zone and the expansion zone results in an elastic deformation during the bending operation.

* * * * *